Feb. 21, 1950 H. HARRIS, JR 2,497,883

ELECTRONIC COMPUTER

Filed Jan. 28, 1943 2 Sheets-Sheet 1

INVENTOR
HERBERT HARRIS, JR.
BY Paul B. Hunter
HIS ATTORNEY

ELECTRONIC COMPUTER

Filed Jan. 28, 1943 2 Sheets-Sheet 2

INVENTOR
HERBERT HARRIS, JR
BY Paul B. Hunter
HIS ATTORNEY

Patented Feb. 21, 1950

2,497,883

UNITED STATES PATENT OFFICE 2,497,883

ELECTRONIC COMPUTER

Herbert Harris, Jr., Cedarhurst, N. Y., assignor to The Sperry Corporation, a corporation of Delaware Application January 28, 1943, Serial No. 474,052

14 Claims. (Cl. 235—61)

My invention relates to electric computers and circuits for electric discharge devices, and concerns particularly electronic computing apparatus.

It is an object of my invention to provide an improved, rapid and convenient computing arrangement suitable for performing mathematical computations on electrical quantities. Another object is to provide such an arrangement avoiding the use of mechanical parts. Another object of my invention is to provide methods and apparatus suitable for electrically determining a function of two or more quantities on which a computation is to be carried out. Other and further objects and advantages will become apparent as the description proceeds.

In accordance with my invention in its preferred form, when used for multiplying two variable quantities, I employ a variable gain amplifier. I apply to the amplifier an input proportional to one of the variable quantities to be multiplied, and I vary the gain in proportion to the other of the variable quantities to be multiplied. The output then represents the product of the two quantities.

For increasing the accuracy of the variation in gain in accordance with the second variable quantity, I employ a feed-back arrangement for correcting any lack of linearity in gain. I provide a source of constant input for reference, and means for comparing the second variable quantity with the component of the output corresponding to the reference input only. This output component varies in accordance with gain since it represents a constant input component. Any deviation between the two values applied to the comparison means is fed back to the input side of the amplifier for adjusting its gain.

To avoid confusion between the variable input quantity and the constant magnitude reference quantity, I utilize different frequencies for these two quantities and separate the amplifier outputs corresponding thereto by means of suitable filters.

A better understanding of my invention will be afforded by the following detailed description considered in connection with the accompanying drawing, and those features which are believed to be novel and patentable will be pointed out in the claims appendant thereto.

In the drawing.

Like reference characters are utilized throughout the drawing to designate like parts.

Figure 1:
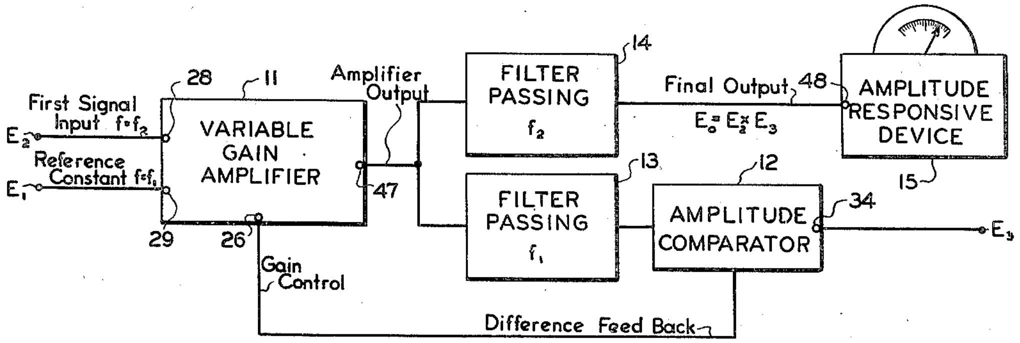
Fig. 1 is a block diagram of one embodiment of my invention.

For the sake of illustration, I have shown in Fig. 1 a computing arrangement which is represented and will be described as a product circuit or product amplifier. However, the same device may obviously be used for squaring and by suitable interchange of terminals may also be used as a quotient device.

Considering first the use of the arrangement for multiplying two variable quantities, I provide a variable gain amplifier 11 with means for applying an input signal proportional to one of the variable quantities and means for varying the gain in proportion to the second variable quantity. In order to obtain linear relationship between variation in gain and the variable quantity which is intended to control the gain, I provide an additional input of constant value with means for comparing the output component corresponding thereto with the second variable quantity. In the drawing, the input signals are represented symbolically as being voltages, although my invention is not limited to the use of voltages for representing the quantities in the computation. The input reference signal is an alternating voltage of predetermined constant amplitude designated by the symbol $E_1$. The first variable quantity or multiplicand is represented by a variable voltage designated by the symbol $E_2$. The second variable quantity or multiplier is represented by a variable voltage designated by the symbol $E_3$. The result produced by the apparatus or the answer to the computation is an output voltage represented by the symbol $E_0$. The capital-letter symbols $E_1$, $E_2$ and $E_3$ are utilized to represent the amplitudes of the input voltages, and their respective instantaneous values may be represented by lower-case letter symbols $e_1$, $e_2$ and $e_3$.

The gain of the amplifier 11 is maintained at a value proportional to the variable voltage $E_3$ by providing an amplitude comparator 12 for comparing the amplifier output corresponding to the reference constant $E_1$ with the variable voltage $E_3$ and varying the amplifier gain until these two quantities have been brought substantially in accord. Since the input voltage $E_1$ is constant, adjustment of the amplifier gain to make the corresponding output substantially equal to the variable voltage $E_3$ results in adjustment of gain proportional to variations in the value of the voltage $E_3$.

In order to avoid confusion between the variable voltage input $E_2$ and the reference constant $E_1$, the source of the voltage $e_1$ is chosen with a frequency $f_1$ different from any frequency which may appear in the first signal input $e_2$. A suitable device such as a band-pass filter 13 is interposed between the output of the variable gain amplifier 11 and the amplitude comparator 12 for separating and passing only the component of amplifier output at frequency $f_1$, corresponding to the reference voltage $e_1$.

For eliminating output voltage of the frequency of the constant reference voltage $e_1$ from the final output circuit, a second filter 14 is interposed between the output side of the amplifier 11 and the final output terminals, which may be connected to a voltage responsive device, such as a voltmeter 15, for example, for reading the voltage $E_0$, which represents the product of the voltage amplitudes $E_2$ and $E_3$.

The filter 14 should be a suitable type of filter, such as a band elimination filter, for example, for eliminating voltages of the frequency of the reference voltage $e_1$ from the final output voltage $E_0$.

When the apparatus is used purely for purposes of computation and variable input voltages are produced for the purpose of representing quantities in carrying out a computation, the variable input voltage $e_2$ is preferably also a single frequency voltage or pure sine wave voltage of frequency $f_2$. In this case the filter 14 may be a band-pass filter, and the two frequencies in question are preferably sufficiently far apart so that the filters 13 and 14 will function well for separating the two frequencies. In order to make the apparatus quickly responsive to variations of the variable input voltages, the frequency of the reference voltage $e_1$ is in any event relatively high in comparison with any frequency which may be present in the variable input voltage $e_2$. In the drawing, the voltage $e_1$ is represented as having a frequency $f=f_1$, and the voltage $e_2$ is represented as having a frequency $f=f_2$. For ordinary computer applications, a second variable input voltage $e_3$ will also have a frequency $f=f_2$. However, within the limits of operation of the amplitude comparator 12, my invention is not limited to the use of any particular frequency or to the use of a pure sine wave, as the voltage $e_3$. The voltage $e_3$ may even be a slowly varying voltage without any particular carrier frequency other than a D.-C. component. Nevertheless the frequencies $f_1$ and $f_2$ should be high in comparison with the rates of variation in magnitude of the envelopes $E_2$ and $E_3$ of the instantaneous voltages $e_2$ and $e_3$.

Figure 2:
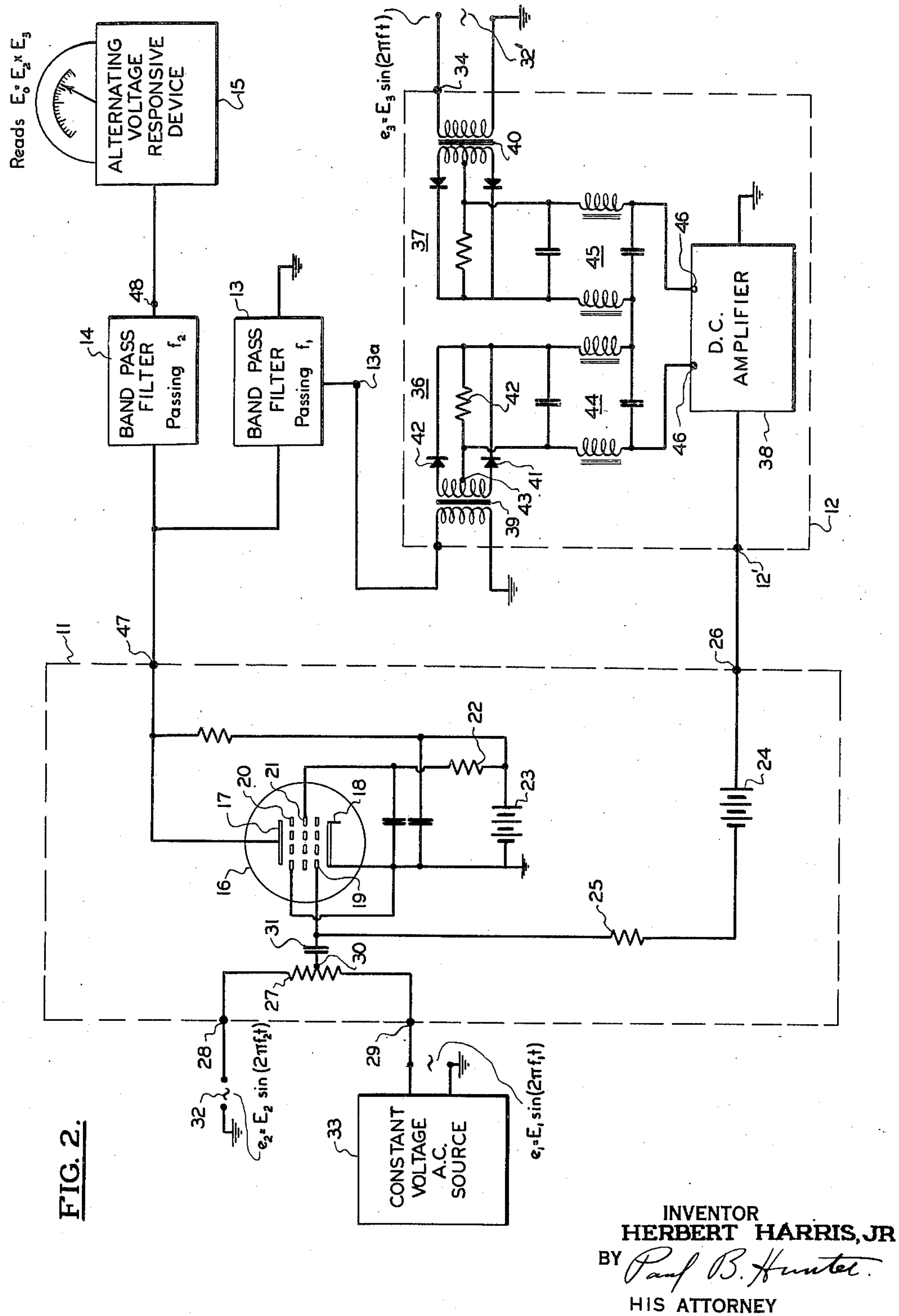
Fig. 2 is a circuit diagram of the apparatus of Fig. 1, illustrating certain elements in greater detail.

Any suitable form of apparatus for altering the amplitude of input signal may be employed. Although my invention is not limited to the use of electronic circuits, it may be carried out conveniently utilizing electronic tubes of the variable gain type. Any suitable form of variable gain amplifier may be employed, in which the gain may be controlled in response to variations in a quantity, in this case an electrical quantity such as voltage. In Fig. 2 I have illustrated the use of a discharge device 16 of the control grid type to form the variable gain amplifier 11. The discharge device 16 may, for example, take the form of a multi-grid vacuum tube, although my invention is not limited thereto. Preferably the tube 16 is of the type in which the gain may readily be varied by variation in the voltage applied to one of its control electrodes. A tube having characteristics similar to those of the 6K7 tube, for example, may be employed. As shown, the tube 16 comprises an anode 17, a control electrode or grid 19, and additional grids such as a suppressor grid 20 and a screen grid 21. The suppressor grid 20 is connected in a conventional manner to the cathode 18, and the screen grid 21 is also conventionally connected through a dropping resistor 22 to the positive terminal of a source of voltage, such as a B battery 23, the negative terminal of which is grounded to the cathode 18.

In the connection shown, gain control is accomplished by variation in the bias of the control electrode 19. For bringing the operation of the tube 16 in a suitable portion of its characteristic curve, a fixed bias of a suitable voltage depending upon the tube employed is provided. Such a fixed bias may take the form of a C battery 24 connected between the amplitude comparator 12 and the control electrode 19. A grid leak or coupling resistor 25 is preferably included in the connection. For application of gain-control voltage, a gain-control terminal 26 is provided in the amplifier 11.

The comparator 12 is provided with an output terminal 12′ which is connected to the gain control terminal 26 of the variable gain amplifier 11.

Any suitable means may be provided for applying the two input signal voltages $e_1$ and $e_2$ to the control electrode 19. For example, as shown, an averaging circuit may be provided, consisting of a resistor 27 connected between two separate input terminals 28 and 29 with an intermediate connection 30 coupled through a coupling condenser 31 to the control electrode 19. For supplying the variable input voltage $e_2$, a suitable variable voltage generator 32 is provided. In the case of a single frequency pure-wave generator, the output of the generator may be represented by the equation $$e_2 = E_2 \sin(2\pi f_2 t)$$

The reference voltage of constant amplitude value $E_1$ may be provided by any suitable source; for example, a regulated power supply 33 may be provided, supplying alternating current having a voltage represented by the equation $$e_1 = E_1 \sin(2\pi f_1 t)$$

It will be understood that the values $E_2$ and $E_1$ represent the envelopes of the alternating current voltage waves, the envelope $E_2$ being variable and the envelope $E_1$ being constant.

A variable voltage generator 32′ may be provided for supplying the second variable voltage $e_3$ to another computer input terminal 34. The wave form of the generator 32′ may be represented by the equation $$e_3 = E_2 \sin(2\pi f_3 t)$$

where $E_3$ is a variable envelope.

The amplitude comparator 12 may take any suitable form for providing a unidirectional voltage varying in accordance with deviations between the peak values or amplitudes of two alternating current quantities which may or may not be at the same frequency. As shown in Fig. 2, the amplitude comparator 12 may take the form of a pair of full wave rectifier circuits 36 and 37 having filtered outputs connected in opposition and preferably having a direct current amplifier 38 interposed between the rectifier outputs and the gain control terminal 26.

As shown in the drawing, all of the voltages $E_1$, $E_2$, $E_3$ and $E_0$ having a common grounded terminal, which is the negative terminal of the tube 16. In order to isolate the ground connections of the output from the filter 13 and of the source 32′ for supplying the voltage $E_3$, I preferably provide means such as transformers 39 and 40. The transformer 39, for example, has its input winding connected between ground and the ungrounded output terminal 13*a* of the filter 13 and has its secondary winding connected to a pair of rectifiers 41 and 42, arranged to form a full wave or bi-phase rectifier with an output or load resistor 42 connected between terminals of like polarity of the rectifiers 41 and 42 and a mid-terminal 43 of the secondary winding of the transformer 39. For filtering the voltage appearing across the resistor 42, a suitable filter circuit 44 of conventional form may be provided. The transformer 40 and the rectifier circuit 37 are connected in a similar manner to a conventional filter circuit 45.

The output of the filter 44 is connected in series opposition with the output of the filter 45 to input terminals 46 of direct-current amplifier 38. The direct-current amplifier 38, in the case of the grounded system shown, has a grounded output terminal. It has also an ungrounded output terminal 12′ connected to the gain control terminal 26 of the variable gain amplifier 11. The band-pass filter 13 and the variable voltage $e_3$ produce opposing uni-directional voltages of the terminals 46. The internal connections of the direct-current amplifier 38 are such that the output voltage at the gain control terminal 26 is positive when the envelope of the voltage $e_3$, exceeds that of the voltage output of the band-pass filter 13. In order to preserve linearity of response to variations in the amplitude $E_2$, the apparatus is so operated that the greatest value of $E_2$ which may be employed is relatively small in comparison with the gain control voltage variations provided by the amplifier 38.

The manner of operation of the apparatus will be apparent from a consideration of the drawing.

When no voltage is applied at the gain control terminal 26, the amplifier 11 has a fixed gain determined by the voltage of the fixed bias battery 24. If a voltage $E_3$ of predetermined value is applied at the input terminal 34 and the constant voltage $E_1$ is applied at the input terminal 29, the voltage $E_1$ will be amplified, appear at the amplifier output terminal 47, pass through the band-pass filter 13 and be compared in amplitude with the voltage $E_3$ in the comparator 12. If there is any difference in the envelopes of the two alternating voltages, a voltage will appear at the gain control terminal 26, which may be either positive or negative depending on which voltage predominates in the comparator 12. If the voltage from the filter 13 predominates, it is an indication that the gain is excessive, and accordingly the voltage of the terminal 26 is lowered to reduce the gain. The requisite variation in gain then takes place until the voltages supplied by the filter 13 and the voltage $E_3$ are substantially equal in peak value or amplitude of the envelope. The output from the direct current amplifier 38 remains at the value requisite to maintain the amplifier 11 at the proper gain. It will be understood that a slight deviation between the two input voltages to the comparator 12 is actually necessary to effect the control. However, the amplification of the direct current amplifier 38 is made very great so that the input voltages to the comparator 12 are substantially alike for any required gain control voltage at the terminal 26.

When $E_3$ is varied, a proportionate variation in gain of the amplifier 11 must take place, because the input $E_1$, remains constant.

For any predetermined value of gain and thus for any predetermined value of the voltage $E_3$, the output voltage $E_0$ of the amplifier 11, appearing at the final output terminal 48, will be proportional to the input voltage $E_2$. Accordingly, the output voltage $E_0$ will be proportional to the product of the voltages $E_2$ and $E_3$. Consequently, an alternating-voltage responsive device 15 connected to the output terminal 35 will be acted upon in proportion to the product of the voltages $E_2$ and $E_3$.

The device 15 may be any suitable device such as, a recorder, a deflecting-pointer instrument, a cathode-ray oscilloscope, or the like, arranged for reading the envelope of the voltage $E_0$. The device 15 may also take the form of any other suitable mechanism, such as an electrically controlled mechanical device intended to be acted upon in accordance with the product of the two quantities, or it may take the form of an additional stage of a computing device in case a computation is to be carried out with more than two quantities.

The operation of the apparatus has been described as used for multiplying two quantities represented by the voltages $E_2$ and $E_3$. The computer may also be utilized as a squaring device by applying equal voltages representing the quantity to be squared at the input terminals 28 and 34. That is the voltages $E_2$ and $E_3$ are made equal.

Furthermore, the apparatus may also be used for multiplying one quantity by some function of the other quantity instead of directly by the other quantity. For example, one quantity may be multiplied by the reciprocal of the other. That is, the apparatus may be used as a quotient computer. This may be accomplished, for example, by interchanging the units connected to the input terminals 29 and 34. If the variable voltage generator 32′ is connected to the terminal 29 and the constant voltage source 33 is connected to the terminal 34, the output voltage $E_0$ will represent $E_2$ divided by $E_1$, $E_1$ being the variable voltage representing the divisor applied at the terminal 29, and $E_3$ in this case being the constant voltage applied at the terminal 34. The voltage $E_2$ is, as before, the variable input voltage at the terminal 28.

From the foregoing, it will be seen that the voltage $E_0$ passed through filter 14 to the amplitude responsive device 15 represents the product of voltage $E_2$ and voltage $E_3$ divided by the voltage $E_1$. When voltage $E_1$ is constant, voltage $E_0$ represents the product $E_2 \times E_3$. When voltage $E_3$ is constant, voltage $E_0$ represents the ratio $E_2/E_1$.

Figure 3:
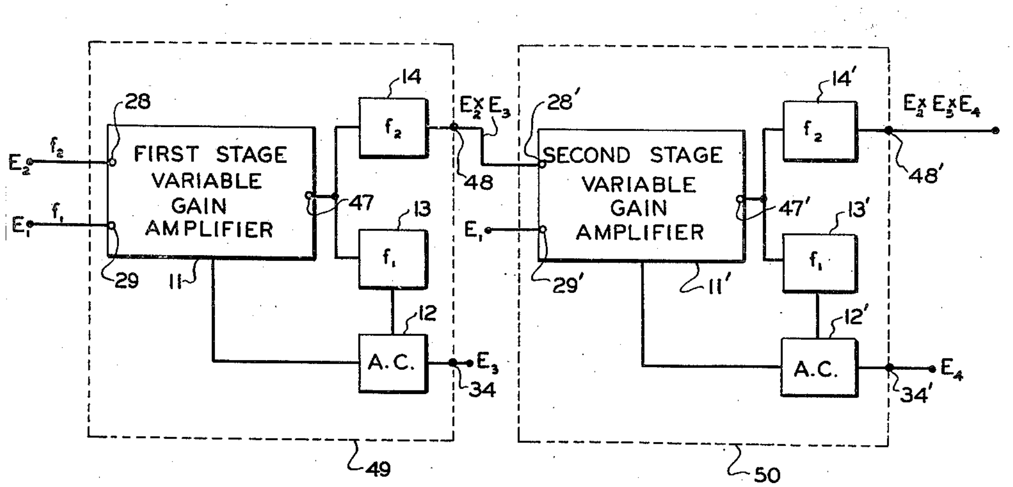
Fig. 3 is a block diagram of a modification of the arrangement of Fig. 1, showing the manner in which computing units may be combined for carrying out a computation including a greater number of variable quantities.

If a computation is to be carried out on more than two variable quantities, additional computer stages may be connected in cascade as illustrated in Fig. 3. For example, if three quantities represented by voltages $e_2$, $e_3$ and $e_4$ are to be multiplied in order to obtain a voltage proportional to their product, a first stage computer circuit 49 corresponding to the apparatus of Fig. 2 may be utilized together with a second stage computer circuit 50 connected in cascade with the first stage 49. All the elements of the stage 50 in this case correspond to elements in the stage 49. Corresponding elements in the stage 50 are designated by primed reference numerals.

Constant magnitude reference input voltages $E_1$ at a frequency $f_1$ are applied to both of the variable amplifiers 11 and 11'. The product of the amplitudes of the voltages $E_2$ and $E_3$ is applied as a variable input to the second stage variable gain amplifier 11'. The output at 48' of the second computer stage 50 accordingly equals the product of $E_2$ and $E_3$ multiplied by the third quantity $E_4$. My invention is not limited to the arrangement illustrated, however; and if preferred, the points of connection of the voltages $E_2$ times $E_3$ and the voltage $E_4$ may be interchanged.

By cascading additional units, the product of any number of quantities may be obtained electronically, and one or more terms of the product may be the reciprocal of an input quantity, if desired. In order to introduce the reciprocal of the quantity instead of the quantity itself, one of the stages is arranged in the manner of a quotient computer, as previously explained. For example, to obtain the result of the multiplication of two quantities and the division of the product by a third quantity, the first stage 49 may be arranged as a product computer, and the second stage 50 may be arranged as the quotient computer with the product of the first stage applied at the terminals 28' of the second stage variable gain amplifier 11' and the divisor applied at the input terminal 29' of the second stage variable gain amplifier 11'. In this case, constant reference voltages are applied at the input terminal 29 of the first stage variable gain amplifier 11 and the input terminal 34' of the second stage computer 50.

Whether each stage of the computer is arranged as a product computer or a quotient computer, it satisfies the equation $x \times y = z$; where $E_2$ may be one of the quantities, $x$, $y$, or $z$; one of the voltages $E_1$ or $E_3$ is constant, and the other represents $x$ or $y$; and $E_0$ is the remaining one of the three quantities, $x$, $y$, and $z$.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Product measuring apparatus, comprising a variable gain amplifier with a pair of input terminals, a gain control terminal and an output terminal, a pair of filters for passing first and second frequencies, respectively, a final output terminal, an amplitude comparator having a pair of input terminals and a difference output terminal and arranged to provide an output voltage varying as the difference of magnitudes of two input voltages, means for applying a reference voltage of constant amplitude at said first frequency to the first input terminal of the amplifier, means for applying a variable voltage representing one of two quantities to be multiplied at the second input terminal of the amplifier, said variable voltage having said second frequency, and means for applying a second variable voltage representing a second quantity to be multiplied at one of the terminals of the input amplitude comparator, the second frequency filter being interposed between the output terminal of the amplifier and the final output terminal of the apparatus, the first frequency filter being interposed between the output terminal of the amplifier and the remaining terminal of the amplitude comparator, and the difference voltage output terminal of the comparator being coupled to the gain control terminal of the amplifier for varying the gain of the amplifier in accordance with the difference of magnitudes of the voltages at the comparator input terminals.

2. A quotient computer comprising a variable gain amplifier with a pair of input terminals adapted to have a pair of input signals applied thereto representing two quantities one to be divided by the other, said amplifier also having an output terminal, and an amplitude comparator with a first input terminal adapted to have a constant reference voltage applied thereto and a second input terminal responsive to variations in amplifier output produced by variations in an amplified version of the second amplifier input signal, said amplitude comparator having a difference output terminal connected to said amplifier for controlling the gain of the amplifier in accordance with the difference between the voltage of said amplifier version and said constant reference signal.

3. In combination, an amplifier of the variable gain type, means for exciting the amplifier at two separable frequencies, one of which is a control frequency, means for eliminating the control frequency from the amplifier output, means for varying the gain in response to variations in an electrical quantity, and means responsive to amplifier output at the control frequency for correcting the gain in response to deviations between said electrical quantity and the amplifier output at the control frequency.

4. A method of determining the amplitude ratio of two signals comprising the steps of altering the amplitude of said signals in proportion, controlling said alteration to maintain the amplitude of one of said altered signals to substantially constant, and determining said ratio by measuring the amplitude of the other of said altered signals.

5. A method of determining the square of the amplitude of a variable input signal comprising the steps of generating a substantially constant input signal, altering the output amplitudes of said variable input signal and said constant input signal in proportion, controlling said alteration to maintain the output amplitude of said constant input signal proportional to the variable input signal, and determining said square by measuring the output amplitude of said variable input signal.

6. A method of determining the amplitude product of two variable input signals comprising the steps of generating a substantially constant amplitude input signal, altering the first of said variable input signals and said constant input signal in proportion, controlling said alteration to maintain the output amplitude of said constant input signal proportional to the second of said variable input signals, and determining said product by measuring the output amplitude of said first variable input signal.

7. Apparatus for providing an output signal having an amplitude directly proportional to the product of a first and a second input signal and inversely proportional to a third input signal, comprising in combination, signal altering means for proportionally altering the output amplitude of said first and said third input signals, means coupled to said amplitude altering means for maintaining the output amplitude of said third input signal proportional to said second input signal in a predetermined ratio, and means for supplying the output amplitude of said first input signal to utilization apparatus.

8. Computing apparatus comprising: a variable gain amplifier having an input circuit, an output circuit and a gain control circuit; means for applying to the input circuit of said amplifier a first voltage of a first frequency and a second voltage of a second frequency whereby amplified versions of said voltages are produced in the output circuit of said amplifier; and means responsive to the amplified version of said first voltage and to a third voltage for applying to said gain control circuit a gain control voltage varying as the relative strength of said third voltage and said amplified version of said first voltage for maintaining a predetermined relation therebetween, whereby the amplitude of the amplified version of said second voltage varies according to the product of said second and third voltages divided by said first voltage.

9. Apparatus for producing an output voltage varying as the product of the magnitudes of a first voltage and a second voltage, comprising a variable gain amplifier for receiving said first voltage and producing a variably amplified output version thereof; and means for varying the gain of said amplifier in proportion to the magnitude of said second voltage, whereby the magnitude of the amplified version of said first voltage varies according to the product of the magnitudes of said first and second voltages, said last-named means comprising means for supplying a reference voltage to the input circuit of said amplifier, means coupled to the output circuit of said amplifier for separating the amplified version of said reference voltage and the amplified output of said first voltage, and comparator means for receiving said amplified reference voltage version and said second voltage and adjusting the gain of said amplifier according to the difference thereof to equalize said voltages.

10. Apparatus for producing an output voltage varying according to the quotient of the product of the magnitudes of first and second voltages divided by the magnitude of a third voltage, comprising a variable gain amplifier for receiving the first and second voltage and producing equally amplified output versions thereof; and means for varying the gain of said amplifier in direct proportion to the ratio of the magnitudes of the third voltage and the first voltage, whereby the magnitude of the amplified version of said second voltage varies directly as the ratio of the product of the magnitudes of said second and third voltages to the magnitude of said first voltage, said means for varying the gain of said amplifier comprising means coupled to the output circuit of said amplifier for selecting therefrom said amplified version of said first voltage, and comparator means for varying the gain of said amplifier according to the difference between the magnitudes of the third voltage and said amplified version of said first voltage.

11. Apparatus as defined in claim 10, wherein the magnitude of said first voltage is constant, whereby said output voltage varies as the product of the magnitudes of said second and third voltages.

12. Apparatus as defined in claim 10, wherein the magnitude of said third voltage is constant, whereby said output voltage varies as the quotient of said second voltage and said first voltage.

13. Apparatus as defined in claim 10, wherein the magnitudes of said third voltage and said second voltage bear a fixed ratio relationship, whereby said output voltage varies as the quotient of the square of the magnitude of said second voltage divided by the magnitude of said first voltage.

14. Apparatus as defined in claim 10, wherein the magnitudes of said second and third voltages bear a fixed ratio relationship and said first voltage magnitude is constant, whereby the magnitude of said output voltage varies as the square of the magnitude of said second voltage.

HERBERT HARRIS, Jr.

REFERENCES CITED

The following references are of record in the file of this patent:

UNITED STATES PATENTS

| Number | Name | Date |
|---|---|---|
| 1,794,393 | Brown et al. | Mar. 3, 1931 |
| 1,869,209 | Mead, Jr. | July 26, 1932 |
| 2,019,594 | Black | Nov. 5, 1935 |
| 2,100,375 | Blair | Nov. 30, 1937 |
| 2,111,607 | Black | Mar. 22, 1938 |
| 2,149,727 | Conklin | Mar. 7, 1939 |
| 2,171,216 | Koch | Aug. 29, 1939 |
| 2,178,333 | Blair | Oct. 31, 1939 |
| 2,179,915 | Blair | Nov. 14, 1939 |
| 2,296,353 | Kinsburg | Sept. 22, 1942 |
| 2,425,405 | Vance | Aug. 12, 1947 |

FOREIGN PATENTS

| Number | Country | Date |
|---|---|---|
| 291,083 | Great Britain | Apr. 25, 1929 |
| 520,228 | Great Britain | Apr. 18, 1940 |

Certificate of Correction

Patent No. 2,497,883 February 21, 1950

HERBERT HARRIS, JR.

It is hereby certified that errors appear in the printed specification of the above numbered patent requiring correction as follows:

Column 2, line 36, after the word "variable" insert *alternating*; column 4, line 63, for that portion of the equation reading "$E_2$ sin" read $E_2$ *sin*;

and that the said Letters Patent should be read with these corrections therein that the same may conform to the record of the case in the Patent Office.

Signed and sealed this 23rd day of May, A. D. 1950.

[SEAL]

THOMAS F. MURPHY,
*Assistant Commissioner of Patents.*